(12) United States Patent
Mao et al.

(10) Patent No.: US 10,187,939 B2
(45) Date of Patent: Jan. 22, 2019

(54) DRIVE CIRCUIT

(71) Applicant: GE Lighting Solutions, LLC, East Cleveland, OH (US)

(72) Inventors: Zhu Mao, Shanghai (CN); Bo Zhang, Shanghai (CN); Fangyuan Lin, Shanghai (CN)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/717,839

(22) Filed: Sep. 27, 2017

(65) Prior Publication Data

US 2018/0092175 A1 Mar. 29, 2018

(30) Foreign Application Priority Data

Sep. 29, 2016 (CN) .......................... 2016 1 0864331

(51) Int. Cl.
*H05B 33/08* (2006.01)
*H05B 37/02* (2006.01)
*H05B 41/36* (2006.01)

(52) U.S. Cl.
CPC ..... *H05B 33/0815* (2013.01); *H05B 33/0809* (2013.01); *H05B 37/0272* (2013.01); *H05B 41/36* (2013.01); *H05B 33/0845* (2013.01)

(58) Field of Classification Search
CPC . H05B 33/0815; H05B 37/0272; H05B 41/36
USPC ........................................................ 315/307
See application file for complete search history.

(56) References Cited

U.S. PATENT DOCUMENTS

| 4,529,891 | A | * | 7/1985 | Oida | .................... | H03K 5/2418 327/77 |
|---|---|---|---|---|---|---|
| 5,729,443 | A | * | 3/1998 | Pavlin | ................. | H02M 3/3381 363/21.12 |
| 2013/0264961 | A1 | * | 10/2013 | Chang | ...................... | H04B 1/48 315/201 |
| 2015/0237693 | A1 | * | 8/2015 | Knoedgen | .......... | H05B 33/0815 315/224 |
| 2015/0312982 | A1 | * | 10/2015 | Melanson | .......... | H05B 33/0815 315/287 |
| 2015/0312986 | A1 | * | 10/2015 | Bell | .................... | H05B 33/0815 315/193 |

\* cited by examiner

*Primary Examiner* — Daniel D Chang
(74) *Attorney, Agent, or Firm* — Peter Dimauro; GE Global Patent Operation

(57) ABSTRACT

A drive circuit coupled to a switching device for controlling operations of a load, which includes: a drive element configured to be coupled to the switching device; a control circuit for shutting down and turning on the drive element to control the switching device to operate and stop the load, the control circuit including a control switch having a first terminal coupled to the drive element and a second terminal to receive a control signal for controlling the drive element operation. The control switch is turned on by a first control signal, shutting down the drive element and the switching device to stop operating the load. The control switch is turned off by a second control signal, turning on the drive element and controlling the switching device to operate the load normally.

10 Claims, 5 Drawing Sheets

DRIVE CIRCUIT

FIELD OF INVENTION

The present disclosure relates to a drive circuit that is shut down to make the load standby without shutting down the main circuit, particularly to a drive circuit for controlling low power standby of LEDs or other types of lamps.

BACKGROUND OF THE INVENTION

Compared with an ordinary light source, LED lamps have characteristics of high efficiency, environmental protection and long service life, so they are becoming a mainly selective solution for reducing energy consumption of indoor and exterior lighting.

As the LED lighting system market is growing continually, in addition to a need for high power conversion efficiency during normal operation, standby power consumption also becomes a focus that is commonly paid attention to in the LED industry. Many countries and districts in the world have all constituted corresponding regulatory standards to raise a threshold for admitting LED lamps, for example, Europe has stipulated that power consumption of LED in a standby mode shall be lower than 0.5 W.

In a conventional LED lighting application, there are usually two ways for an LED driver and an LED lamp to become standby: the first one is to switch off the power supply line by an external power relay, the second one is to switch it off using a digital interface such as a digital addressable lighting interface (DALI). Switching off the power supply line by the external power relay may reduce the standby power, but the price is relatively expensive and personnel is needed to manually switch off, which cannot achieve remote controllability nor can take advantage of flexible control of the building LED lighting system. In a conventional DALI and other addressable driving systems, instructions for shutting down require the circuit to have a low voltage for keeping active, therefore, the energy consumption in a standby state is still around 10% of that in normal operation, still greater than 0.5 W.

Therefore, it is necessary to provide a simple circuit for shutting down the driver without switching off the power supply line, to solve the technical problems as mentioned above.

SUMMARY OF INVENTION

One aspect of the present disclosure is to provide a drive circuit. The drive circuit is configured to be coupled to at least one switching device for controlling operations of a load, which comprises: a drive element configured to be coupled to the switching device; a control circuit for shutting down and turning on the drive element to control the switching device to make the load stop operation and operate normally, the control circuit comprising a control switch having a first terminal coupled to the drive element and a second terminal configured to receive a control signal for controlling the drive element to be shut down and turned on, wherein when the control switch receives a first control signal, the control switch is turned on to shut down the drive element and thereby to control the switching device to make the load stop operation, and when the control switch receives a second control signal, the control switch is turned off to turn on the drive element and thereby to control the switching device to make the load operate normally.

Another aspect of the present disclosure is to provide a flyback topology circuit. The circuit comprises a switching device and the above drive circuit. The drive circuit is coupled to a gate of the switching device and drives the switching device to be turned on and shut down, thus controlling the operation of the load.

A further aspect of the present disclosure is to provide a half bridge topology circuit, comprising a first switching device, a second switching device and the above drive circuit. Specifically, the second switching device is coupled to the first switching device, and the drive circuit is coupled to gates of the first switching device and the second switching device respectively to make the load stop operation and operate normally by controlling the first and second switching devices.

An objective of the present disclosure is to provide a simple control circuit, which may shut down a part of or all circuits inside the driver with a very small external current without switching off the power supply line, achieving low power consumption standby.

BRIEF DESCRIPTION OF THE DRAWINGS

The present disclosure can be better understood in light of description of embodiments of the present disclosure with reference to the accompanying drawings, in which.

DETAILED DESCRIPTION

Unless defined otherwise, the technical or scientific terms used herein should have the same meanings as commonly understood by one of ordinary skilled in the art to which the present disclosure belongs. The terms "first", "second" and the like in the Description and the Claims of the present application for invention do not mean any sequential order, number or importance, but are only used for distinguishing different components. Similarly, the terms "a", "an" and the like do not denote a limitation of quantity, but denote the existence of at least one. The terms "comprises", "comprising", "includes", "including" and the like mean that the element or object in front of the "comprises", "comprising", "includes" and "including" encompasses the elements or objects and their equivalents illustrated following the "comprises", "comprising", "includes" and "including", but do not exclude other elements or objects. The term "coupled" or "connected" or the like is not limited to being connected physically or mechanically, but may comprise electric connection, no matter directly or indirectly.

The present disclosure is based on a simple control circuit, which makes the load standby without switching off the main circuit, thereby achieving a lower power consumption. Such control circuit may be applied to various kinds of lighting circuits, and applying the control circuit to a flyback topology and a half bridge topology as examples in the following to explain how to achieve low power standby.

Figure 1:
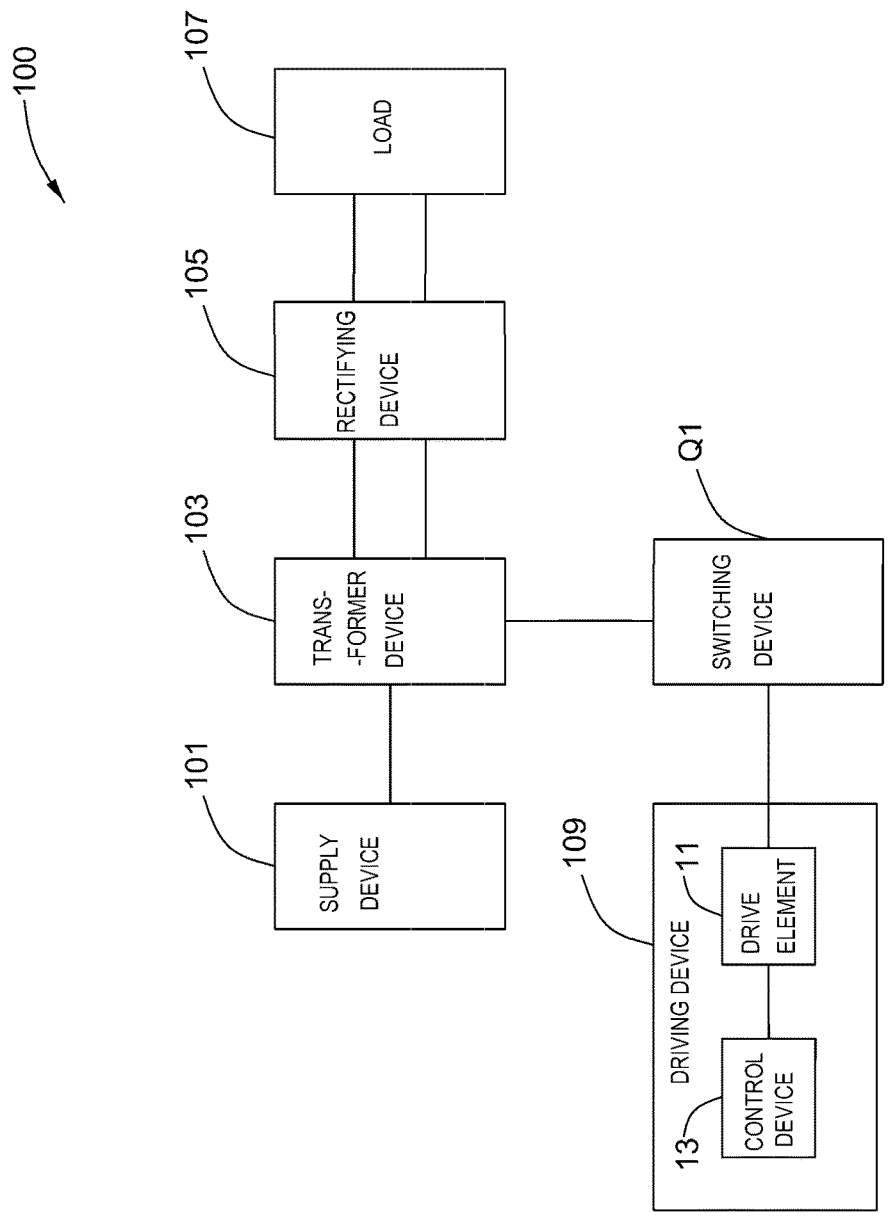
FIG. 1 illustrates a figure of functional modules for one embodiment of a lighting apparatus of the present disclosure.

FIG. 1 illustrates a figure of functional modules for one embodiment of a lighting apparatus 100 of the present disclosure. The lighting apparatus 100 comprises a supply device 101, a switching device $Q_1$, a transformer device 103, a rectifying device 105, a load 107 and a driving device 109. The transformer device 103 is configured to transform a voltage input from the supply device 101 to an appropriate output voltage that passes the rectifying device 105 to be used for supplying power to the load 107. The load 107 is one or more types of lamps, e.g., gas discharge lamp, compact fluorescent lamp (CFL), LED lamp and the like, and may also be other lamps of the same type. The switching device $Q_1$ is coupled to the transformer device 103, and the driving device 109 is coupled to the switching device $Q_1$ to drive the switching device $Q_1$ to make the load stop operation and operate normally. The switching device $Q_1$ may comprise a semi-controllable or controllable switching device that has a constant value such as transistor, MOSFET, IGBT and the like. The driving device 109 comprises a drive element 11 and a control device 13.

In the lighting apparatus 100 during normal operation, the control device 13 is in a disconnected state, the supply device 101 inputs a voltage, the drive element 11 starts to oscillate and drive the switching device $Q_1$ to make the lighting apparatus 100 start up, supplying sufficient voltage for driving the load 107 to operate.

Explanations will be made in the following with reference to FIG. 2 as to how the control circuit of the present disclosure shuts down a part of or all drive circuits to make the load standby with a very small external current without shutting down the main circuit, so as to achieve lower power consumption.

Figure 2:
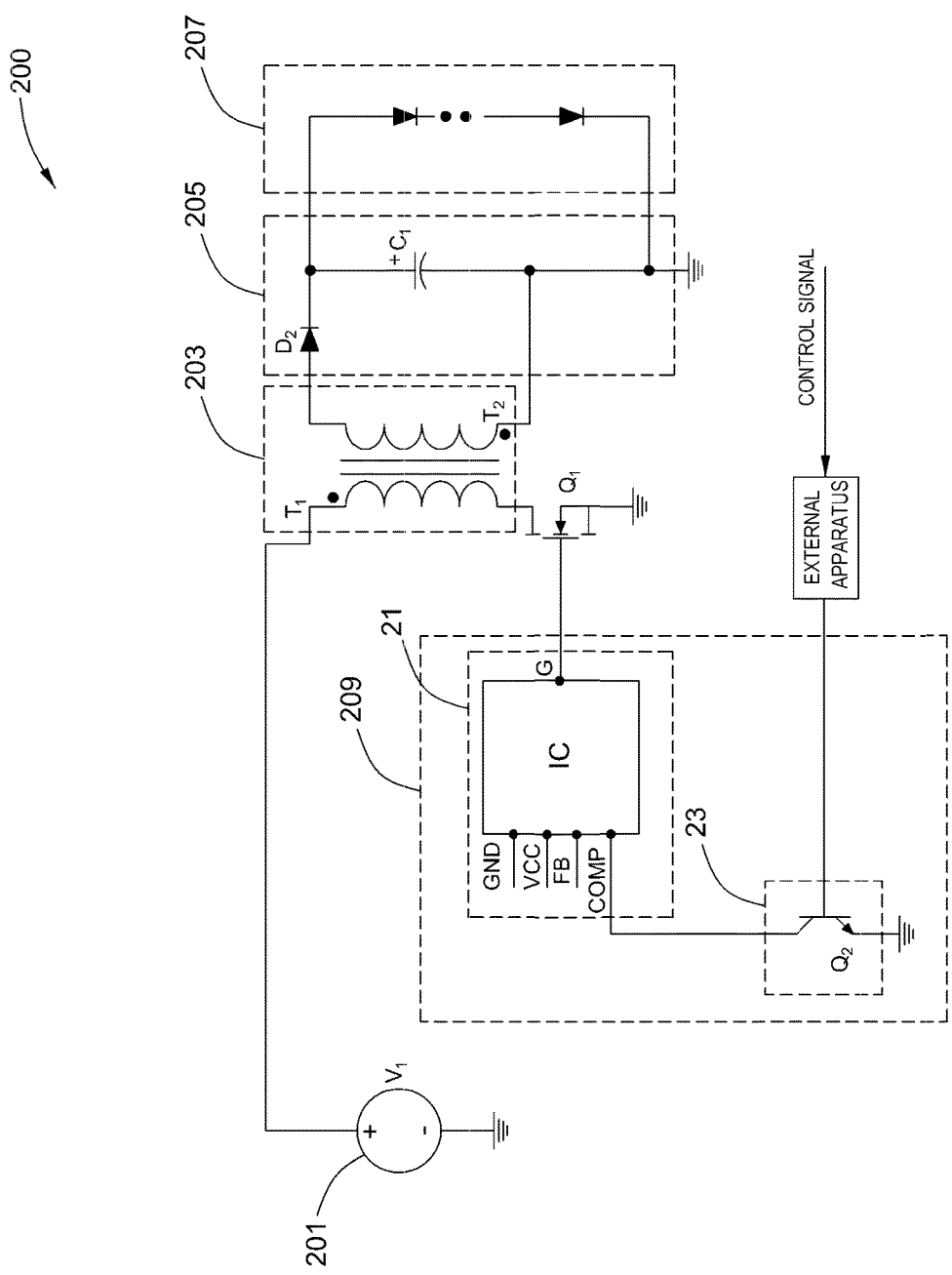
FIG. 2 illustrates a lighting circuit of a first embodiment of the present disclosure.

FIG. 2 illustrates a lighting circuit 200 of a first embodiment of the present disclosure. The lighting circuit 200 comprises a supply circuit 201, a switching device $Q_1$, a transformer 203, a rectifying circuit 205, a load 207 and a drive circuit 209. The rectifying circuit 205 comprises a diode $D_2$ and a capacitor $C_1$. The diode $D_2$ has a negative electrode coupled to a secondary side of the transformer 203 and a positive electrode coupled to a positive electrode of the capacitor $C_1$ that is coupled to two terminals of the load 207. In other embodiments, the rectifying circuit 205 may be other circuit connections well known by the person skilled in the art. The transformer 203 comprises a primary side $T_1$ and a secondary side $T_2$ coupled with each other for transforming a voltage $V_1$ input from the supply circuit 201 to an appropriate output voltage that passes the rectifying circuit 205 for supplying power to the load 207. The switching device $Q_1$ for driving the transformer 203 to operate is a MOSFET (metal oxide semiconductor field effect transistor) with a source grounded, a drain coupled to the primary side $T_1$ of the transformer 203 and a gate coupled to the drive circuit 209. The drive circuit 209 comprises a drive element 21 and a control circuit 23. The drive element 21 is coupled to the switching device $Q_1$ to drive the switching device $Q_1$ to be turned on and switched off, so as to control the operation of the load 207.

In the embodiment as shown in FIG. 2, the drive element 21 is integrated on an integrated circuit (IC) with a gate coupled to the switching device $Q_1$. The IC further comprises four terminals that are a ground terminal (GND), a power supply terminal (VCC), a feedback signal input terminal (FB) and a feedback compensation terminal (COMP) respectively.

In the embodiment as shown in FIG. 2, the control circuit 23 comprises a control switch $Q_2$ that may be selected from switching devices such as transistor, field effect transistor, MOSFET and the like. When the control switch $Q_2$ is a transistor, a base of the transistor is configured to be coupled to an external apparatus for receiving a control signal, an emitter of the transistor is grounded, and a collector of the transistor is configured to be coupled to the drive element 21. When the control switch $Q_2$ is a field effect transistor, a gate of the field effect transistor is configured to be coupled to an external apparatus for receiving a control signal, a source of the field effect transistor is grounded, and a drain of the field effect transistor is configured to be coupled to the drive element 21.

In some embodiments, the external apparatus is a single chip microcomputer or other electronic apparatuses such as a computer and the like that may be used to receive and transmit a control signal to the control switch $Q_2$. The control signal may be a wired signal, a signal sent from a DALI network, a WIFI signal, a radio signal and the like. In industrial, commercial or building lighting, a computer may be used to send a control signal through a DALI network; in a common lighting system, the control signal may also be sent by a switch, a remote controller, a cell phone and the like.

The control circuit 23 achieves low power standby by at least three embodiments as follows.

In the embodiment as shown in FIG. 2, a first terminal of the control switch $Q_2$ is coupled to the feedback compensation terminal (COMP) of the drive element 21. At this moment, when a second terminal of the control switch $Q_2$ receives a first control signal, i.e., standby signal, the control switch $Q_2$ is turned on and the feedback compensation terminal (COMP) of the drive element 21 is short circuited such that the drive element 21 is shut down, and then the switching device $Q_1$ is controlled to make the load 207 stop operation, thereby achieving lower power consumption. When the second terminal of the control switch $Q_2$ receives a second control signal, i.e., restart signal, the control switch $Q_2$ is switched off such that the drive element 21 is restarted, and then the switching device $Q_1$ is controlled to make the load operate normally. In some embodiments, the first control signal is a high level signal greater than 2V. The control circuit 23 may also comprise other electronic elements that help to achieve controlling function better or more easily. For example, in some embodiments, the control circuit 23 further comprises an inverter, e.g., transistor, which is arranged between the control switch $Q_2$ and the external apparatus, and at this moment, the first control signal is a low level signal.

Figure 3:
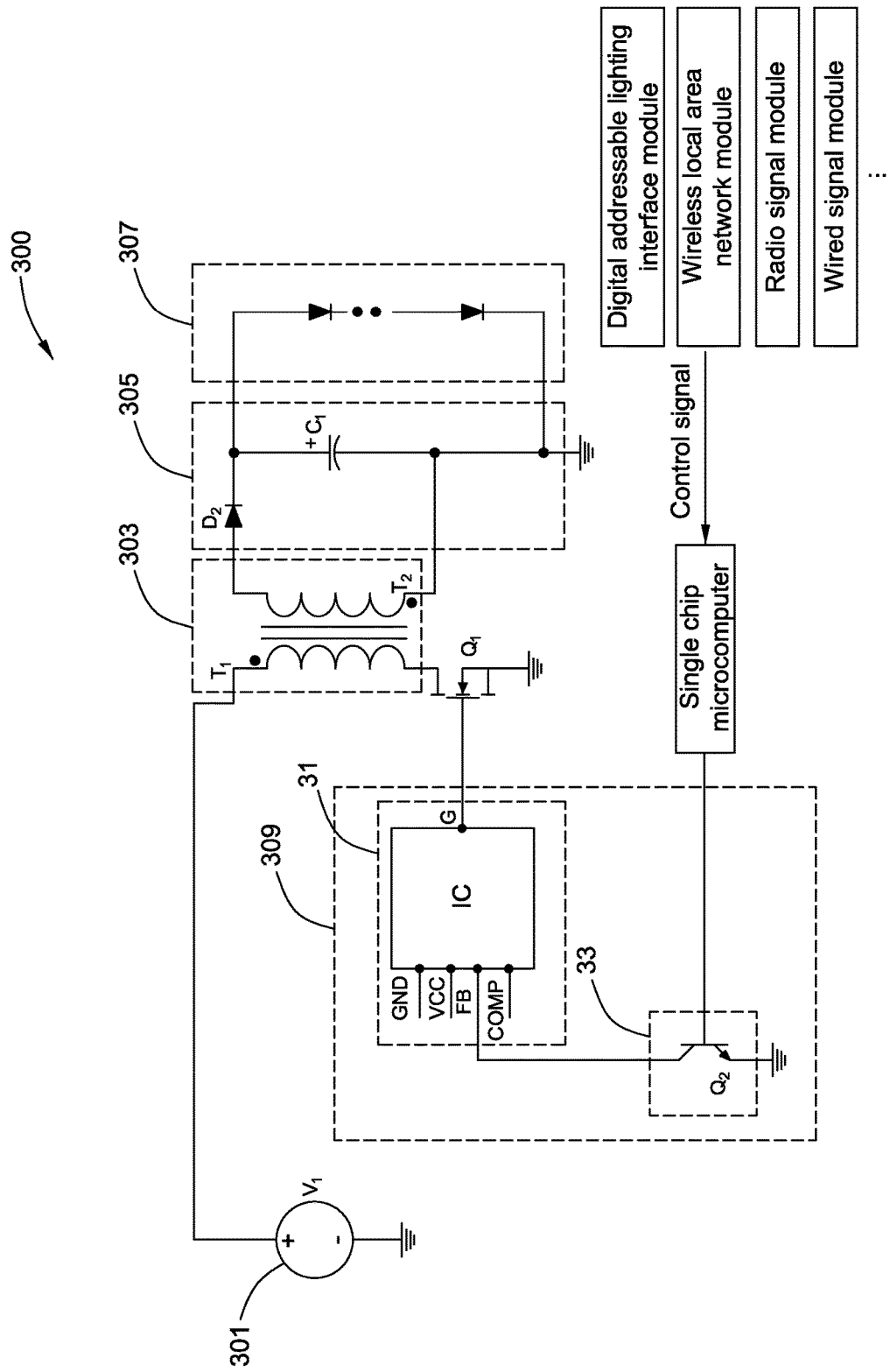
FIG. 3 illustrates a lighting circuit of a second embodiment of the present disclosure.

FIG. 3 illustrates a lighting circuit 300 of a second embodiment of the present disclosure. In the embodiment as shown in FIG. 3, the first terminal of the control switch $Q_2$ is coupled to the feedback signal input terminal (FB) of the drive element 31. At this moment, when the second terminal of the control switch $Q_2$ receives the first control signal, i.e., standby signal, the control switch $Q_2$ is turned on and the feedback signal input terminal (FB) of the drive element 31 is short circuited such that the drive element 31 is shut down, and then the switching device $Q_1$ is controlled to make the load 307 stop operation, thereby achieving lower power consumption. When the second terminal of the control switch $Q_2$ receives the second control signal, i.e., restart signal, the control switch $Q_2$ is switched off such that the drive element 31 is restarted, and then the switching device $Q_1$ is controlled to make the load operate normally.

Figure 4:
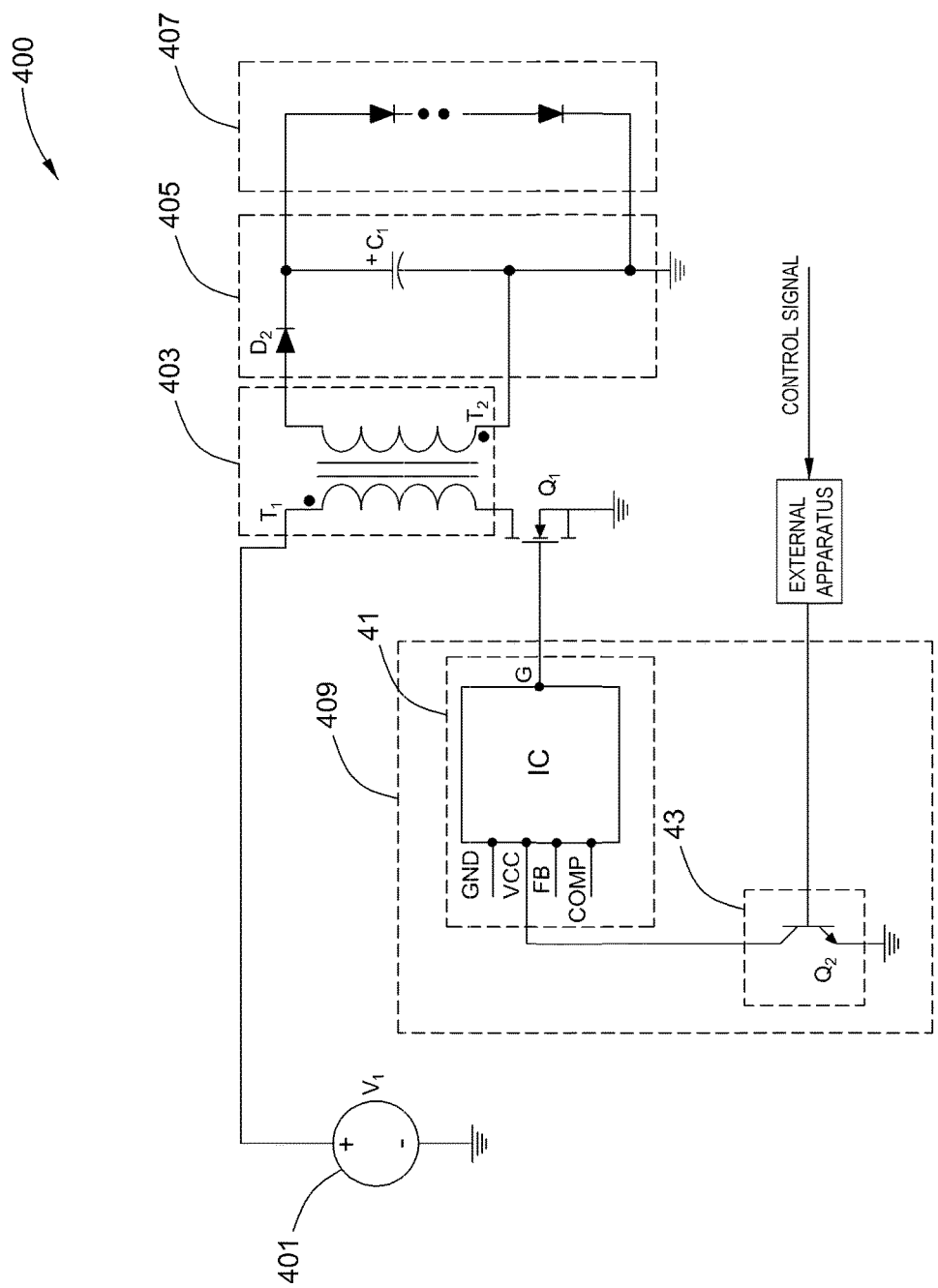
FIG. 4 illustrates a lighting circuit of a third embodiment of the present disclosure.

FIG. 4 illustrates a lighting circuit 400 of a third embodiment of the present disclosure. In the embodiment as shown in FIG. 4, the first terminal of the control switch $Q_2$ is coupled to the power supply terminal (VCC) of the drive element 41. At this moment, when the second terminal of the control switch $Q_2$ receives the first control signal, i.e., standby signal, the control switch $Q_2$ is turned on and the power supply terminal (VCC) of the drive element 41 is short circuited such that the drive element 41 is shut down, and then the switching device $Q_1$ is controlled to make the load 407 stop operation, thereby achieving lower power consumption. When the second terminal of the control switch $Q_2$ receives the second control signal, i.e., restart signal, the control switch $Q_2$ is switched off such that the drive element 41 is restarted, and then the switching device $Q_1$ is controlled to make the load operate normally.

In the above embodiments, without shutting down the main circuit, the standby power of the lighting circuit is about 0.3-0.4 W, which is lower than the standard of 0.5 W stipulated in Europe.

Figure 5:
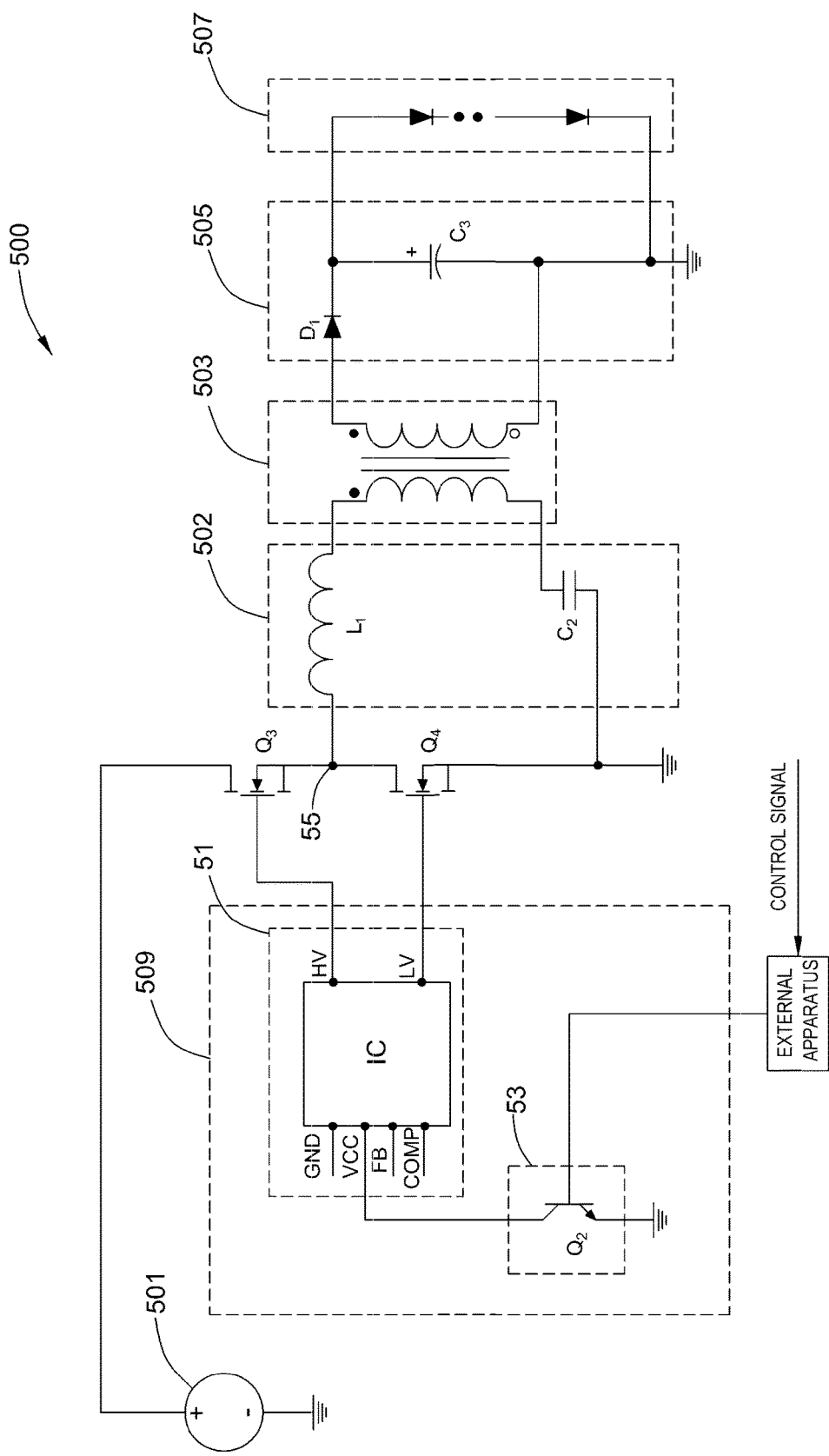
FIG. 5 illustrates a lighting circuit of a fourth embodiment of the present disclosure.

FIG. 5 illustrates a lighting circuit 500 of a fourth embodiment of the present disclosure. The lighting circuit 500 comprises a supply circuit 501, a first switching device $Q_3$, a second switching device $Q_4$, a filtering circuit 502, a transformer 503, a rectifying circuit 505, a load 507 and a drive circuit 509. The drive circuit 509 is coupled to the first switching device $Q_3$ and the second switching device $Q_4$ respectively, and converts the voltage input from the supply circuit 501 into an appropriate output voltage through the filtering circuit 502 and the transformer 503 by controlling the first switching device $Q_3$ and the second switching device $Q_4$ to be turned on and switched off, the output voltage further passing through the rectifying circuit 505 to supply power to the load 507. The first switching device $Q_3$ has a drain coupled to the supply circuit 501, a gate coupled to the drive circuit 509 and a source connected with the drain of the second switching device $Q_4$ at a connection point 55. The second switching device $Q_4$ has a gate coupled to the drive circuit 509 and a source grounded. The filtering circuit 502 consists of an inductor $L_1$ and a capacitor $C_2$, the inductor $L_1$ having a terminal coupled to the connection point 55 and another terminal coupled to a primary side of the transformer 503, the capacitor $C_2$ having a terminal grounded and another terminal coupled to the primary side of the transformer 503. The filtering circuit 502 plays a greater role of attenuation on high frequency signals, which can inhibit grid noise effectively. The rectifying circuit 505 comprises a diode $D_1$ and a capacitor $C_3$. The diode $D_1$ has a negative electrode coupled to a secondary side of the transformer 503 and a positive electrode coupled to a positive electrode of the capacitor $C_3$ that is coupled to two terminals of the load 507. In other embodiments, the filtering circuit 502 and the rectifying circuit 503 may be other circuit connections well known by the person skilled in the art.

In the embodiment as shown in FIG. 5, the drive circuit 509 comprises a drive element 51 and a control circuit 53. The drive element 51 is coupled to the first switching device $Q_3$ and the second switching device $Q_4$ respectively and controls the operation of the load 507 by driving the first and second switching devices to be turned on and switched off. In some embodiments, the drive element 51 is integrated on an IC. A high voltage terminal HV of the IC is coupled to the first switching device $Q_3$, and a low voltage terminal LV of the IC is coupled to the second switching device $Q_4$. The IC further comprises four terminals, which are a ground terminal (GND), a power supply terminal (VCC), a feedback signal input terminal (FB) and a feedback compensation terminal (COMP) respectively.

In the embodiment as shown in FIG. 5, the control circuit 53 comprises a control switch $Q_2$ that may be selected from switching devices such as transistor, field effect transistor, MOSFET and the like. When the control switch $Q_2$ is a transistor, a base of the transistor is configured to be coupled to an external apparatus for receiving a control signal, an emitter of the transistor is grounded, and a collector of the transistor is configured to be coupled to the drive element 51. When the control switch $Q_2$ is a field effect transistor, a gate of the field effect transistor is configured to be coupled to the external apparatus for receiving a control signal, a source of the field effect transistor is grounded, and a drain of the field effect transistor is configured to be coupled to the drive element 51. In some embodiments, the external apparatus applied to the half bridge drive circuit as shown in FIG. 5 is the same as that applied to the flyback drive circuit as shown in FIG. 2.

In the embodiment as shown in FIG. 5, the control circuit 53 achieves low power standby by coupling the control switch $Q_2$ to the power supply terminal (VCC) of the drive element 51. At this moment, when the first terminal of the control switch $Q_2$ receives the first control signal, i.e., standby signal, the control switch $Q_2$ is turned on and the power supply terminal (VCC) of the drive element 51 is short circuited such that the drive element 51 is shut down, and then the first switching device $Q_3$ and the second switching device $Q_4$ are controlled to make the load 507 stop operation, thereby achieving lower power consumption. When the second terminal of the control switch $Q_2$ receives the second control signal, i.e., restart signal, the control switch $Q_2$ is switched off such that the drive element 51 is restarted, and then the first switching device $Q_3$ and the second switching device $Q_4$ are controlled to make the load operate normally.

From the embodiments as summarized above, it can be seen that the control circuit of the present disclosure that uses fewer elements and simple connections makes the load standby without shutting down the main circuit, so as to achieve lower power consumption, saving cost.

Although the present disclosure has been set forth in combination with specific embodiments, the person skilled in the art shall understand that many modifications and variations may be made to the present disclosure. Therefore, it should be recognized that the intention of the claims is to cover all these modifications and variations within the real concept and range of the present disclosure.

What is claimed is:

1. A drive circuit configured to be coupled to at least one switching device for controlling operations of a load, comprising:
    a drive element configured to be coupled to the at least one switching device; and
    a control circuit for shutting down and turning on the drive element to control the switching device to make the load stop operation and operate normally, the control circuit comprising:
    a control switch having a first terminal coupled to the drive element and a second terminal configured to receive a control signal for controlling the drive element to be shut down and turned on,
    wherein when the control switch receives a first control signal, the control switch is turned on to shut down the drive element and thereby to control the switching device to make the load stop operation, and when the control switch receives a second control signal, the control switch is turned off to turn on the drive element and thereby to control the switching device to make the load operate normally.

2. The drive circuit of claim 1, wherein the drive element comprises a ground terminal, a power supply terminal, a feedback signal input terminal and a feedback compensation terminal.

3. The drive circuit of claim 2, wherein the first terminal of the control switch is coupled to the feedback compensation terminal, the power supply terminal or the feedback signal input terminal of the drive element.

4. The drive circuit of claim 1, wherein the control switch is a transistor.

5. The drive circuit of claim 4, wherein a base of the transistor is configured to be coupled to an external equipment for receiving the control signal, an emitter of the transistor is connected to the ground, and a collector of the transistor is configured to be coupled to the drive element.

6. The drive circuit of claim 4, wherein a gate of the field effect transistor is configured to be coupled to an external equipment for receiving the control signal, a source of the field effect transistor is connected to the ground, and a drain of the field effect transistor is configured to be coupled to the drive element.

7. The drive circuit of claim 5, wherein the external equipment is a single chip microcomputer for receiving a control signal sent from a digital addressable lighting interface module, a wireless local area network module, a radio signal module or a wired signal module, and sending the control signal to the control switch.

8. The drive circuit of claim 1, wherein the drive circuit is a lamp drive circuit, and the load comprises an LED.

9. A flyback topology circuit, comprising the drive circuit according to claim 1, wherein the flyback topology circuit further comprises:
   a switching device; and
   the drive circuit being coupled to a gate of the switching device to control the switching device to make the load stop operation and operate normally.

10. A half bridge topology circuit, comprising the drive circuit according to claim 1, wherein the half bridge topology circuit further comprises:
   a first switching device;
   a second switching device coupled to the first switching device; and
   the drive circuit being coupled to gates of the first switching device and the second switching device to control the first and second switching devices to make the load stop operation and operate normally.

* * * * *